(No Model.)

C. L. COMEAUX.
SUGAR CANE WAGON.

No. 540,638. Patented June 11, 1895.

Witnesses.
A. Ruppert.
G. B. Towles

Inventor:
Cyprien L. Comeaux,
Per
Thomas P. Simpson,
atty.

UNITED STATES PATENT OFFICE.

CYPRIEN LUCAS COMEAUX, OF NEW ORLEANS, LOUISIANA.

SUGAR-CANE WAGON.

SPECIFICATION forming part of Letters Patent No. 540,638, dated June 11, 1895.

Application filed March 26, 1895. Serial No. 543,211. (No model.)

*To all whom it may concern:*

Be it known that I, CYPRIEN LUCAS CO-MEAUX, a citizen of the United States, residing at New Orleans, in the parish of Orleans and State of Louisiana, have invented certain new and useful Improvements in Sugar-Cane Wagons; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a sugar cane body for wagons, to enable five rows to be planted at once as the wagon moves along astride one row.

Figure 1:
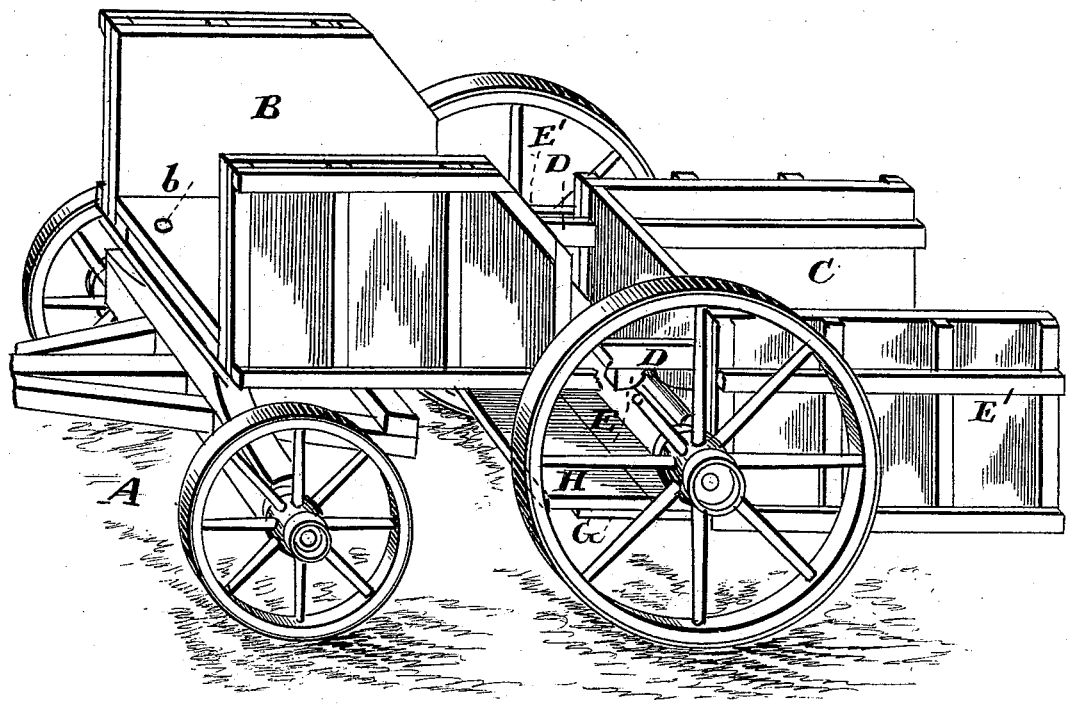
Figure 2:
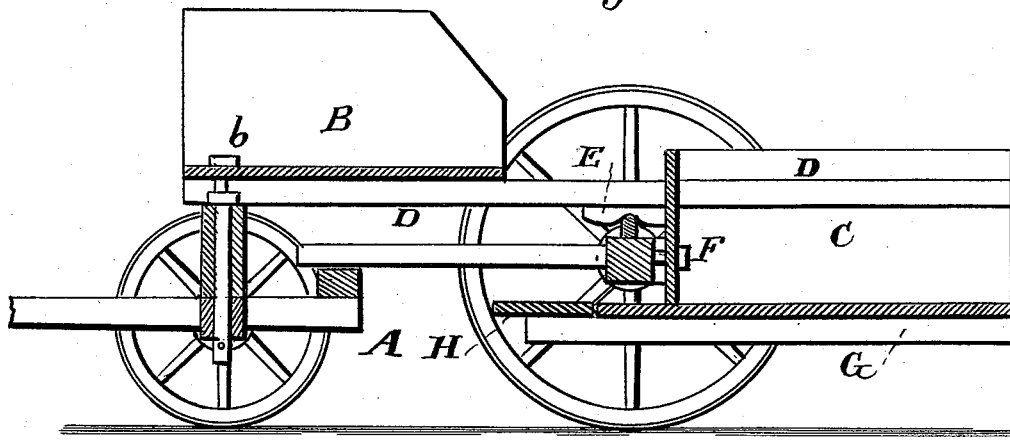

Figure 1 of the drawings is a perspective view of my invention, and Fig. 2 a vertical longitudinal section.

In the drawings, A represents a wagon running gear on the front bolster of which I fasten the front and highest compartment B of my sugar cane body by the detachable pins $b\,b$ while the lower compartment C is secured to the rear bolster by means of the bottom concaved irons E. I preferably use a front end-board in the rear compartment, but none in the front one.

D D are two strong beams passing under the compartment B on the inside and made fast to both bottom and side, while they pass also on the inside but through the upper part of the lower compartment C where they are securely fastened to the sides thereof. I preferably connect the two compartments also on the outside by the smaller reinforcing beams E' E' but they are only a betterment and not absolutely necessary.

As an additional support to the rear compartment C, I use a horizontal pin F projecting from the rear and middle of the hindermost axle of the wagon.

The under sills G G of the compartment C are extended out to support the platform H which is thus brought between the two compartments, so that the cane may be conveniently loaded on and taken off the high front compartment by a man standing on the platform while another stands on the ground to co-operate with him. But one man, standing on the ground, is necessary, to load on and unload from the low compartment C.

The body is adapted to any size of running gear or to wheels of any height.

What I claim as new is—

A sugar cane body for wagons having a high compartment in front, a low one in the rear and an intermediate platform, the compartments rigidly connected by beams D D and the platform arranged on extension sills G G, all substantially as shown and described.

In testimony whereof I affix my signature in presence of two witnesses.

CYPRIEN LUCAS COMEAUX.

Witnesses:
G. G. KRONENBERGER,
J. L. EISWORTH.